United States Patent
Yang et al.

(10) Patent No.: US 10,086,716 B2
(45) Date of Patent: Oct. 2, 2018

(54) CHARGING SYSTEM, VEHICLE COMPRISING THE SAME AND METHOD FOR CONTROLLING CHARGING VEHICLE WITH THE SAME

(71) Applicant: BYD COMPANY LIMITED, Shenzhen (CN)

(72) Inventors: Guangming Yang, Shenzhen (CN); Xiaohui Zhang, Shenzhen (CN); Zheqing Tang, Shenzhen (CN); Jian Liu, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 498 days.

(21) Appl. No.: 14/411,360

(22) PCT Filed: Jun. 26, 2013

(86) PCT No.: PCT/CN2013/078030
§ 371 (c)(1),
(2) Date: Dec. 24, 2014

(87) PCT Pub. No.: WO2014/000649
PCT Pub. Date: Jan. 3, 2014

(65) Prior Publication Data
US 2015/0137754 A1 May 21, 2015

(30) Foreign Application Priority Data

Jun. 27, 2012 (CN) .......................... 2012 1 0214502
Jun. 27, 2012 (CN) ...................... 2012 2 0303636 U

(51) Int. Cl.
*H02J 7/00* (2006.01)
*B60L 11/18* (2006.01)
*H02J 7/02* (2016.01)
*B60L 3/00* (2006.01)

(52) U.S. Cl.
CPC ............. *B60L 11/185* (2013.01); *B60L 3/003* (2013.01); *B60L 11/1811* (2013.01);
(Continued)

(58) Field of Classification Search
CPC ..................................................... B60L 11/185
(Continued)

(56) References Cited

U.S. PATENT DOCUMENTS

2011/0040436 A1 2/2011 Yamamoto et al.
2011/0055037 A1* 3/2011 Hayashigawa ....... B60L 3/0069
705/26.1
(Continued)

FOREIGN PATENT DOCUMENTS

CN 201294399 Y 8/2009
CN 201594757 U 9/2010
(Continued)

*Primary Examiner* — Richard V Muralidar
(74) *Attorney, Agent, or Firm* — Anova Law Group, PLLC

(57) ABSTRACT

A charging system for a vehicle, a vehicle comprising the charging system, and a method for controlling charging a vehicle with the charging system are provided. The charging system comprises: a battery; a first charging branch comprising a first rectifying unit and a first charging interface, in which the battery is connected with the first charging interface via the first rectifying unit; a second charging branch comprising a second rectifying unit and a second charging interface, in which the battery is connected with the second charging interface via the second rectifying unit; and a control unit connected with the first rectifying unit and the second rectifying unit respectively and configured to control the first charging branch and the second charging branch to charge the battery.

16 Claims, 3 Drawing Sheets

(52) U.S. Cl.
CPC ....... *B60L 11/1812* (2013.01); *B60L 11/1816* (2013.01); *B60L 11/1824* (2013.01); *B60L 11/1846* (2013.01); *B60L 11/1861* (2013.01); *H02J 7/022* (2013.01); *B60L 2210/30* (2013.01); *B60L 2240/545* (2013.01); *B60L 2240/547* (2013.01); *B60L 2240/549* (2013.01); *B60L 2250/10* (2013.01); *B60L 2270/20* (2013.01); *Y02T 10/7005* (2013.01); *Y02T 10/705* (2013.01); *Y02T 10/7044* (2013.01); *Y02T 10/7072* (2013.01); *Y02T 10/7241* (2013.01); *Y02T 90/121* (2013.01); *Y02T 90/127* (2013.01); *Y02T 90/128* (2013.01); *Y02T 90/14* (2013.01); *Y02T 90/169* (2013.01); *Y04S 30/14* (2013.01)

(58) Field of Classification Search
USPC ........................................................ 320/109
See application file for complete search history.

(56) References Cited

U.S. PATENT DOCUMENTS

| 2012/0286720 | A1 | 11/2012 | Fassnacht et al. |
| 2013/0093394 | A1* | 4/2013 | Iyasu ................ B60L 11/1811 |
| | | | 320/109 |
| 2013/0127418 | A1 | 5/2013 | Oh et al. |

FOREIGN PATENT DOCUMENTS

| CN | 102055226 A | 5/2011 |
| CN | 102189934 A | 9/2011 |
| CN | 102403763 A | 4/2012 |
| DE | 102009029091 A1 | 3/2011 |
| EP | 2450221 A2 | 5/2012 |
| JP | 2004343836 A | 12/2004 |
| JP | 2004343846 A | 12/2004 |
| WO | 2012018204 A2 | 2/2012 |

\* cited by examiner

CHARGING SYSTEM, VEHICLE COMPRISING THE SAME AND METHOD FOR CONTROLLING CHARGING VEHICLE WITH THE SAME

CROSS-REFERENCES TO RELATED APPLICATIONS

This application is a national phase entry under 35 U.S.C. § 371 of International Application No. PCT/CN2013/078030, filed on Jun. 26, 2013, which claims the priority to and benefits of Chinese patent application Serial No. 201210214502.5 and Chinese Patent Application Serial No. 201220303636.X, both filed with the State Intellectual Property Office of P. R. China on Jun. 27, 2012, the entire contents of all of which are incorporated herein by reference.

FIELD OF THE INVENTION

The present disclosure relates to the field of vehicle charging and, more particularly, to a charging system for a vehicle, a vehicle comprising the charging system, and a method for controlling charging a vehicle with the charging system.

BACKGROUND

With the development of the science and technology, electric vehicles are taking the place of vehicles with conventional fuel. However, the application of the electric vehicle is limited by some disadvantages. Currently, the electric vehicle is generally charged with only one charging branch. That is, the charging of the electric vehicle depends on one charging connector (also referred to as a charging coupler). In this way, a charging time may be long, which causes inconvenience for consumers when using the electric vehicle.

BRIEF SUMMARY OF THE DISCLOSURE

Embodiments of the present disclosure seek to solve at least one of the problems existing in the prior art to at least some extent.

According to a first aspect of the present disclosure, a charging system for a vehicle is provided. The charging system for the vehicle comprises: a battery; a first charging branch comprising a first rectifying unit and a first charging interface, in which the battery is connected with the first charging interface via the first rectifying unit; a second charging branch comprising a second rectifying unit and a second charging interface, in which the battery is connected with the second charging interface via the second rectifying unit; and a control unit connected with the first rectifying unit and the second rectifying unit respectively and configured to control the first charging branch and the second charging branch to charge the battery.

In some embodiments, the charging system further comprises a battery management unit. The control unit is configured to send a first signal to the battery management unit when the first charging interface is connected with a first charging connector and the second charging interface is connected with a second charging connector. The battery management unit is configured to judge whether the battery needs to be charged after receiving the first signal, and to send a second signal to the control unit when the battery needs to be charged. The control unit is further configured to control the first charging branch and the second charging branch to charge the battery after receiving the second signal.

According to a second aspect of the present disclosure, a vehicle comprising the charging system according to the first aspect of the present disclosure is provided.

According to a third aspect of the present disclosure, a method for controlling charging a vehicle with a charging system is provided. The charging system comprises: a battery, a first charging branch comprising a first rectifying unit and a first charging interface, a second charging branch comprising a second rectifying unit and a second charging interface, a control unit, and a battery management unit. The method comprises: sending a first signal to the battery management unit when the first charging interface is connected with a first charging connector and the second charging interface is connected with a second charging connector; judging by the battery management unit whether the battery needs to be charged after receiving the first signal; if yes, sending a second signal to the control unit by the battery management unit; and controlling the first charging branch and the second charging branch to charge the battery after receiving the second signal.

With the charging system and the method according to embodiments of the present disclosure, the control unit controls the first charging branch and the second charging branch to charge the battery, thus increasing a charging power of the electric vehicle and reducing a charging time significantly. As a fast charging can be performed, the time cost of charging a vehicle can be reduced.

The above summary of the present disclosure is not intended to describe each disclosed embodiment or every implementation of the present disclosure. The Figures and the detailed description which follow more particularly exemplify illustrative embodiments.

Additional aspects and advantages of embodiments of present disclosure may be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure may become apparent and more readily appreciated from the following descriptions made with reference to the accompanying drawings, in which.

DETAILED DESCRIPTION

Figure 1:
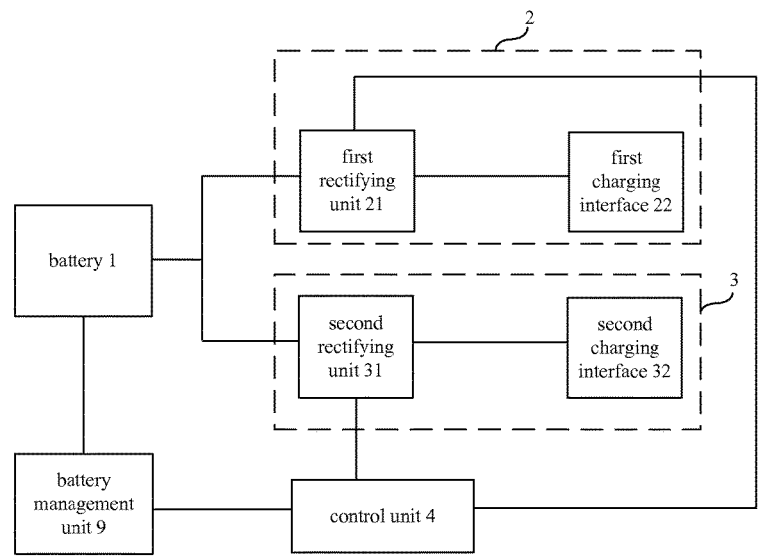
FIG. 1 is a block diagram of a charging system for a vehicle according to an embodiment of the present disclosure.

Reference will be made in detail to embodiments of the present disclosure. The embodiments described herein with reference to drawings are explanatory, illustrative, and used to generally understand the present disclosure. The embodiments shall not be construed to limit the present disclosure.

The same or similar elements and the elements having same or similar functions are denoted by like reference numerals throughout the descriptions.

Figure 2:
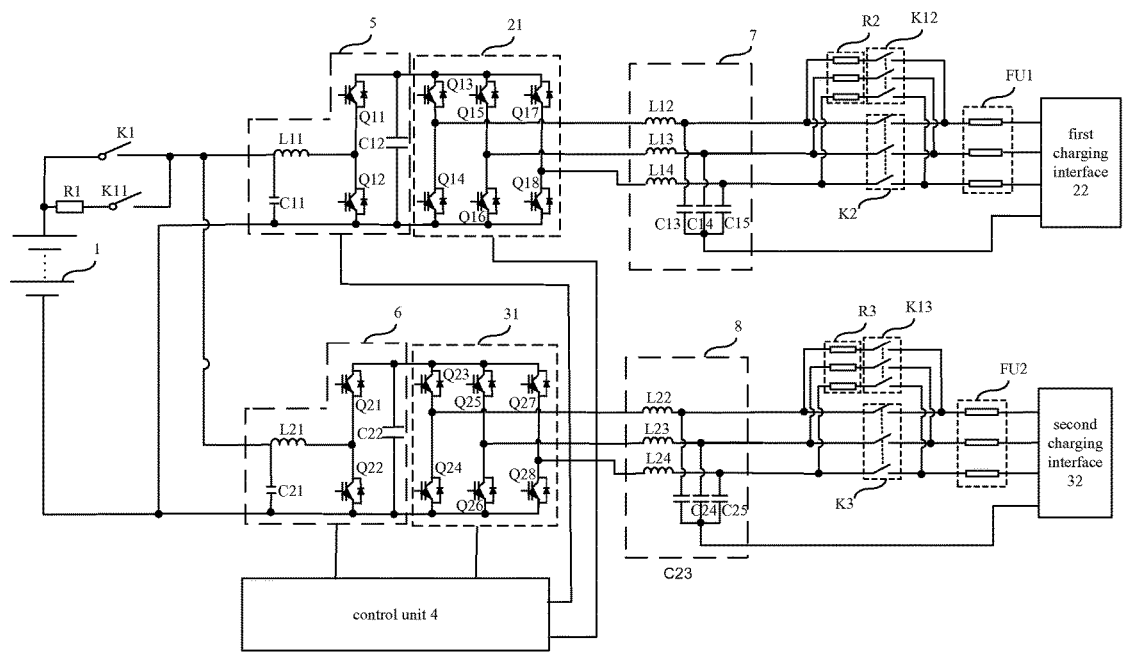
FIG. 2 is a circuit diagram of a charging system for a vehicle according to a preferred embodiment of the present disclosure.

Referring to FIGS. 1-2, a charging system for a vehicle is described in detail as follows.

As shown in FIG. 1, according to an embodiment of the present disclosure, the charging system for the vehicle comprises: a battery 1; a first charging branch 2 comprising a first rectifying unit 21 and a first charging interface 22, in which the battery 1 is connected with the first charging interface 22 via the first rectifying unit 21; a second charging branch 3 comprising a second rectifying unit 31 and a second charging interface 32, in which the battery 1 is connected with the second charging interface 32 via the second rectifying unit 31; and a control unit 4 connected with the first rectifying unit 21 and the second rectifying unit 31 respectively and configured to control the first charging branch 2 and the second charging branch 3 to charge the battery 1.

In some embodiments, the charging system further comprises: a first switch K1 having a first terminal connected with the battery 1 and a second terminal connected with the first rectifying unit 21 and the second rectifying unit 31 respectively, a second switch K2 connected between the first rectifying unit 21 and the first charging interface 22, and a third switch K3 connected between the second rectifying unit 31 and the second charging interface 32.

In some embodiments, the charging system further comprises a battery management unit 9. The battery management unit 9 is connected with the control unit 4 and the battery 1 respectively. The control unit 4 is configured to send a first signal to the battery management unit 9 when the first charging interface 22 is connected with a first charging connector and the second charging interface 32 is connected with a second charging connector. The battery management unit 9 is configured to judge whether the battery 1 needs to be charged after receiving the first signal, and to send a second signal to the control unit 4 when the battery 1 needs to be charged. The control unit 4 is further configured to control the first charging branch 2 and the second charging branch 3 to charge the battery 1 after receiving the second signal.

Those skilled in the art can appreciate that, the first charging connector and the second charging connector may be connected with one charging pile or may be connected with two charging piles respectively, without particular limits.

In some embodiments, the battery management unit 9 is configured to send a second signal to the control unit 4 when the first charging interface 22 is connected with a first charging connector and the second charging interface 32 is connected with a second charging connector. The control unit 4 is further configured to control the first charging branch 2 and the second charging branch 3 to charge the battery 1 after receiving the second signal. Specifically, in the present embodiment, the step of sending the first signal and judging whether the battery 1 needs to be charged is omitted.

Those with ordinary skill may appreciate that, receiving the second signal in the present disclosure is not limited by the above mentioned embodiments. In practice, those skilled in the art may design any other method to make the control unit 4 receive the second signal provided that the same function can be implemented, and the details of which are omitted here.

With the charging system according to embodiments of the present disclosure, the control unit 4 controls the first charging branch 2 and the second charging branch 3 to charge the battery 1, thus increasing charging power of the electric vehicle and reducing charging time significantly. As fast charging can be performed, the time for charging a vehicle can be reduced.

In some embodiments, the first charging branch 2 further comprises a first transforming unit 5 connected between the battery 1 and the first rectifying unit 21, and the second charging branch 3 further comprises a second transforming unit 6 connected between the battery 1 and the second rectifying unit 31. Both the first transforming unit 5 and the second transforming unit 6 are configured to convert an initial voltage from the grid which does not match with a voltage of the battery 1 to a transformed voltage which matches with the voltage of the battery 1.

In some embodiments, the charging system further comprises a first fuse FU1 connected between the first rectifying unit 21 and the first charging interface 22, and a second fuse FU2 connected between the second rectifying unit 31 and the second charging interface 32. The first fuse FU1 and the second fuse FU2 are configured to disconnect a circuit in the charging system when a current in the charging system is too large, thus protecting the charging system from being damaged.

In some embodiments, the charging system further comprises a first filter unit 7 connected between the first rectifying unit 21 and the first charging interface 22, and a second filter unit 8 connected between the second rectifying unit 31 and the second charging interface 32. The first filter unit 7 and the second filter unit 8 are configured to filter out a high-frequency clutter input from the grid, thus enhancing an operation stability of the charging system.

Thus, according to a preferred embodiment of the present disclosure, as shown in FIG. 2, the charging system for the vehicle comprises: battery 1, first switch K1, second switch K2, third switch K3, a first pre-charging resistor R1, a first pre-charging switch K11, a second pre-charging resistor R2, a second pre-charging switch K12, a third pre-charging resistor R3, a third pre-charging switch K13, first transforming unit 5, second transforming unit 6, first rectifying unit 21, second rectifying unit 31, first filter unit 7, second filter unit 8, first fuse Fill, second fuse FU2, first charging interface 22, second charging interface 32, control unit 4, and battery management unit 9.

Specifically, as shown in FIG. 2, a first terminal of the first switch K1 is connected with the battery 1, a second terminal of the first switch K1 is connected with a first terminal of the first transforming unit 5, a second terminal of the first transforming unit 5 is connected with a first terminal of the first rectifying unit 21, a second terminal of the first rectifying unit 21 is connected with a first terminal of the first filter unit 7, a second terminal of the first filter unit 7 is connected with a first terminal of the second switch K2, a second terminal of the second switch K2 is connected with a first terminal of the first fuse FU1, and a second terminal of the first fuse FU1 is connected with the first charging interface 22. Further, the second terminal of the first switch K1 is connected with a first terminal of the second transforming unit 6, a second terminal of the second transforming unit 6 is connected with a first terminal of the second rectifying unit 31, a second terminal of the second rectifying unit 31 is connected with a first terminal of the second filter unit 8, a second terminal of the second filter unit 8 is connected with a first terminal of the third switch K3, a second terminal of the third switch K3 is connected with a first terminal of the second fuse FU2, and a second terminal of the second fuse FU2 is connected with the second charging interface 32.

Referring to FIG. 2, a first terminal of the first pre-charging resistor R1 is connected with a first terminal of the first pre-charging switch K11, and a second terminal of the first pre-charging resistor R1 and a second terminal of the first pre-charging switch K11 are connected with the first switch K1 respectively. A first terminal of the second pre-charging resistor R2 is connected with a first terminal of the second pre-charging switch K12, and a second terminal of the second pre-charging resistor R2 and a second terminal of the second pre-charging switch K12 are connected with the second switch K2 respectively. A first terminal of the third pre-charging resistor R3 is connected with a first terminal of the third pre-charging switch K13, and a second terminal of the third pre-charging resistor R3 and a second terminal of the third pre-charging switch K13 are connected with the third switch K3 respectively.

Referring to FIG. 2, the control unit 4 is connected with the first transforming unit 5, the second transforming unit 6, the first rectifying unit 21, and the second rectifying unit 31 respectively.

Referring to FIG. 2, in some embodiments, the first transforming unit 5 comprises a first capacitor C11, a second capacitor C12, a first inductor L11, a first switching transistor Q11, and a second switching transistor Q12. A first terminal of the first inductor L11 is connected with the second terminal of the first switch K1 and a first terminal of the first capacitor C11 respectively, a second terminal of the first inductor L11 is connected with a second terminal of the first switching transistor Q11 and a first terminal of the second switching transistor Q12 respectively, a first terminal of the first switching transistor Q11 is connected with a first terminal of the second capacitor C12, and a second terminal of the first capacitor C11 is connected with a second terminal of the second capacitor C12 and a second terminal of the second switching transistor Q12 respectively. Similarly, the second transforming unit 6 comprises a third capacitor C21, a fourth capacitor C22, a second inductor L21, a third switching transistor Q21, and a fourth switching transistor Q22. As shown in FIG. 2, a connection relation of these elements in the second transforming unit 6 is similar to that of elements in the first transforming unit 5, and thus detailed description of the same is omitted here.

Referring to FIG. 2, the first rectifying unit 21 is a three-phase full-bridge circuit consisting of six switching transistors Q13, Q14, Q15, Q16, Q17, and Q18. Similarly, the second rectifying unit 31 is a three-phase full-bridge circuit consisting of six switching transistors Q23, Q24, Q25, Q26, Q27, and Q28.

In some embodiments, the first filter unit 7 consists of a third inductor L12, a fourth inductor L13, a fifth inductor L14, a fifth capacitor C13, a sixth capacitor C14, and a seventh capacitor C15, which are connected in a relation as shown in FIG. 2. Similarly, the second filter unit 8 consists of a sixth inductor L22, a seventh inductor L23, an eighth inductor L24, an eighth capacitor C23, a ninth capacitor C24, and a tenth capacitor C25, which are connected in a relation as shown in FIG. 2.

An operation principle of the charging system for the vehicle according to embodiments of the present disclosure is described in details as follows.

When the first charging interface 22 is connected with the first charging connector and the second charging interface 32 is connected with the second charging connector, the control unit 4 controls the first pre-charging switch K11 to be switched on and the first switch K1, the second switch K2, and the third switch K3 to be switched off to perform a first pre-charging. The control unit 4 detects a first voltage V1 between terminals of the second capacitor C12 and a second voltage V2 between terminals of the fourth capacitor C22, and judges whether a difference between the first voltage V1 and a first predetermined voltage is within a second predetermined voltage range (for example, 50V) and a pre-charging time is within a first predetermined time range (for example, 5S), and whether a difference between the second voltage V2 and a second predetermined voltage is within the second predetermined voltage range and the pre-charging time is within the first predetermined time range. If yes, the control unit 4 judges the first pre-charging is successful; and if no, the control unit 4 judges the first pre-charging has failed. In this way, a rapid voltage increase between terminals of the second capacitor C12 or the fourth capacitor C22 which causes a large current impact in the circuit may be avoided, thus preventing damages to the charging system resulted from the large current impact.

With the steps of the first pre-charging, a failure self-test may also be performed for a first circuit between the battery 1 and the first transforming unit 5 and for a second circuit between the battery 1 and the second transforming unit 6. If the control unit 4 judges the first pre-charging is successful, it can be determined that elements or components in the first circuit and the second circuit run normally. If the control unit 4 judges the first pre-charging has failed, it is determined that there is a failure in the first circuit or the second circuit, and thus the user may be reminded that the charging system needs to be repaired.

If the control unit 4 judges the first pre-charging is successful, the control unit 4 controls the first pre-charging switch K11, the second switch K2, and the third switch K3 to be switched off, and the first switch K1, the second pre-charging switch K12, and the third pre-charging switch K13 to be switched on to perform a second pre-charging. The control unit 4 detects a third voltage V3 between terminals of the second capacitor C12 and a fourth voltage V4 between terminals of the fourth capacitor C22, and judges whether the third voltage is within a third predetermined voltage range and the fourth voltage V4 is within a fourth predetermined voltage range. If yes, the control unit 4 judges the second pre-charging is successful; and if no, the control unit 4 judges the second pre-charging has failed. In this way, a rapid voltage increase between terminals of the second capacitor C12 or the fourth capacitor C22 which causes a large current impact in the circuit may be avoided, thus preventing damages to the charging system in resulted from the large current impact.

With the steps of the second pre-charging, a failure self-test may also be performed for a third circuit between the first rectifying unit 21 and the first charging interface 22 and for a fourth circuit between the second rectifying unit 31 and the second charging interface 32. If the control unit 4 judges the second pre-charging is successful, it can be determined that elements or components in the third circuit and the fourth circuit run normally. If the control unit 4 judges the second pre-charging has failed, it can be determined that there is a failure in the third circuit or the fourth circuit, and thus the user may be reminded that the charging system needs to be repaired.

If the control unit 4 judges the second pre-charging is successful, the control unit 4 controls the second pre-charging switch K12 and the third pre-charging switch K13 to be switched off, and the second switch K2 and the third switch K3 to be switched on, and controls the first charging branch 2 and the second charging branch 3 to charge the battery 1. A first voltage from the grid is input to the first charging branch 2 via the first charging interface 22. The first filter unit 7 filters the first voltage to provide a filtered voltage. The first rectifying unit 21 rectifies the filtered voltage to provide a rectified voltage, and then the first transforming unit 5 reduces the rectified voltage to provide a reduced voltage to charge the battery 1. A second voltage from the grid is input to the second charging branch 3 via the second charging interface 32. The second filter unit 8 filters the second voltage to provide a filtered voltage. The second rectifying unit 31 rectifies the filtered voltage to provide a rectified voltage, and then the second transforming unit 6 reduces the rectified voltage to provide a reduced voltage to charge the battery 1.

With the charging system for a vehicle according to embodiments of the present disclosure, the first pre-charging and the second pre-charging are performed before the battery 1 is charged, which not only performs the failure self-test for the whole charging system, but also improves a stability of the charging system. In addition, the rapid voltage increase between terminals of the second capacitor C12 and terminals of the fourth capacitor C22 which may cause the large current impact in the circuit may be avoided, thus preventing the damages to the charging system resulted from the large current impact.

According to embodiments of the present disclosure, a vehicle comprising the charging system described above is also provided.

A method for controlling charging a vehicle with a charging system according to embodiments of the present disclosure is described in details as follows.

Figure 3:
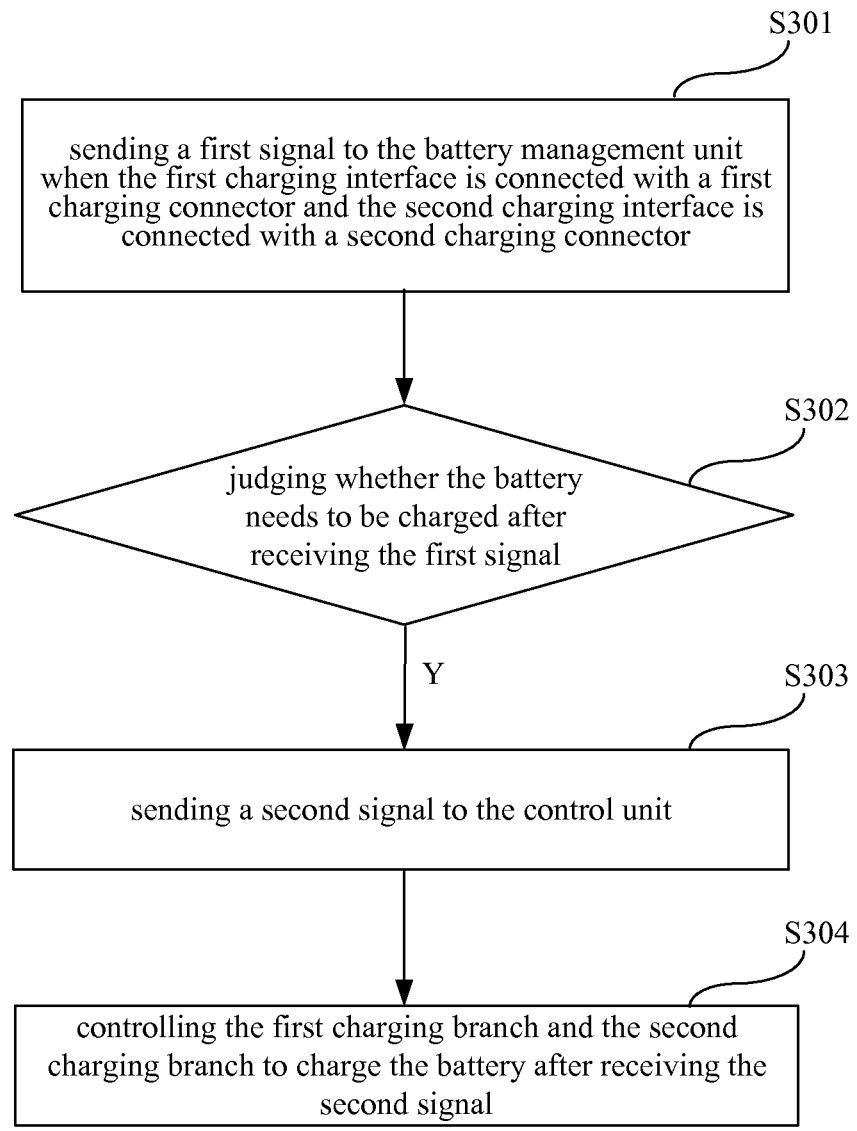
FIG. 3 is a flow chart of a method for controlling charging a vehicle with a charging system according to an embodiment of the present disclosure.

A method for controlling charging a vehicle with a charging system is also provided. The charging system comprises: a battery, a first charging branch comprising a first rectifying unit and a first charging interface, a second charging branch comprising a second rectifying unit and a second charging interface, a control unit, and a battery management unit. Referring to FIG. 3, the method comprises the following steps.

In step S301, the control unit sends a first signal to the battery management unit when the first charging interface is connected with a first charging connector and the second charging interface is connected with a second charging connector.

In step S302, the battery management unit detects the battery and judges whether the battery needs to be charged after receiving the first signal. If yes, step S303 is performed.

In step S303, the battery management unit sends a second signal to the control unit.

In step S304, the control unit controls the first charging branch and the second charging branch to charge the battery after receiving the second signal.

According to an embodiment of the present disclosure, the method further comprises at least one of the following steps.

In step A1, the battery management unit detects a voltage of the battery and judges whether the voltage is within a first predetermined voltage range. If yes, step S303 is performed.

In step B1, the battery management unit detects a temperature of the battery and judges whether the temperature is within a predetermined temperature range. If yes, step S303 is performed.

In a preferred embodiment, the method further comprises the following step.

In step A2, the battery management unit detects a voltage of the battery and judges whether the voltage is within a first predetermined voltage range. If yes, step B2 is performed.

In step B2, the battery management unit detects a temperature of the battery and judges whether the temperature is within a predetermined temperature range. If yes, step S303 is performed.

In some embodiments, the battery management unit judges whether the temperature is within a predetermined temperature range. If the temperature is within the predetermined temperature range, the battery management unit detects a voltage of the battery and judges whether the voltage is within a first predetermined voltage range. If the voltage is within the first predetermined voltage range, step S303 is performed.

With the step A1 or A2, an over-high voltage of the battery may be prevented, thus ensuring the operation safety of the charging system. With the step B1 or B2, an over-high temperature of the battery may be prevented, and thus the operation safety of the charging system may be ensured.

In one embodiment, the charging system further comprises: a first transforming unit, a second transforming unit, a first switch having a first terminal connected with the battery and a second terminal connected with the first rectifying unit via the first transforming unit and connected with the second rectifying unit via the second transforming unit, a second switch connected between the first rectifying unit and the first charging interface, a third switch connected between the second rectifying unit and the second charging interface, and a first pre-charging resistor and a first pre-charging switch, in which a first terminal of the first pre-charging resistor is connected with a first terminal of the first pre-charging switch, and a second terminal of the first pre-charging resistor and a second terminal of the first pre-charging switch are connected with the first switch respectively.

In some embodiments, the step S304 comprises the following steps.

In step C1, the control unit controls the first pre-charging switch to be switched on and the first switch, the second switch, and the third switch to be switched off to perform a first pre-charging after receiving the second signal.

In step C2, the control unit judges whether a first difference between the first busbar voltage V1 of the first charging branch and a first predetermined voltage is within a second predetermined voltage range and a pre-charging time is within a first predetermined time range, and whether a second difference between the second busbar voltage V2 of the second charging branch and a second predetermined voltage is within the second predetermined voltage range and the pre-charging time is within the first predetermined time range.

In step C3, if yes, the control unit controls the first pre-charging switch to be switched off, and the first switch, the second switch and the third switch to be switched on.

In step C4, the control unit controls the first charging branch and the second charging branch to charge the battery.

In one embodiment, the charging system further comprises: a second pre-charging resistor and a second pre-charging switch, in which a first terminal of the second pre-charging resistor is connected with a first terminal of the second pre-charging switch, and a second terminal of the second pre-charging resistor and a second terminal of the second pre-charging switch are connected with the second switch respectively; and a third pre-charging resistor and a third pre-charging switch, in which a first terminal of the third pre-charging resistor is connected with a first terminal of the third pre-charging switch, and a second terminal of the third pre-charging resistor and a second terminal of the third pre-charging switch are connected with the third switch respectively.

In some embodiments, the method further comprises the following steps.

In step D1, the control unit controls the first pre-charging switch, the second switch, and the third switch to be switched off; and the first switch, the second pre-charging switch, and the third pre-charging switch to be switched on to perform a second pre-charging.

In step D2, the control unit judges whether the third busbar voltage V3 of the first charging branch is within a third predetermined voltage range and the fourth busbar voltage V4 of the second charging branch is within a fourth predetermined voltage range. If yes, the control unit controls the second pre-charging switch and the third pre-charging switch to be switched off and the second switch and the third switch to be switched on, and the step C4 is performed.

In some embodiments, the method further comprises the following steps.

In step E, the battery management unit judges whether the battery is fully charged. If yes, the battery management unit sends a third signal to the control unit.

In step F, the control unit controls the first charging branch and the second charging branch to stop charging the battery after receiving the third signal.

In some embodiments, the battery management unit detects an electric quantity, a current, or a voltage of the battery so as to determine or judge whether the battery is fully charged. Those skilled in the art may appreciate that, any other method which is capable of determining a charging state of the battery may be applied in the present disclosure, without particular limits.

Figure 4:
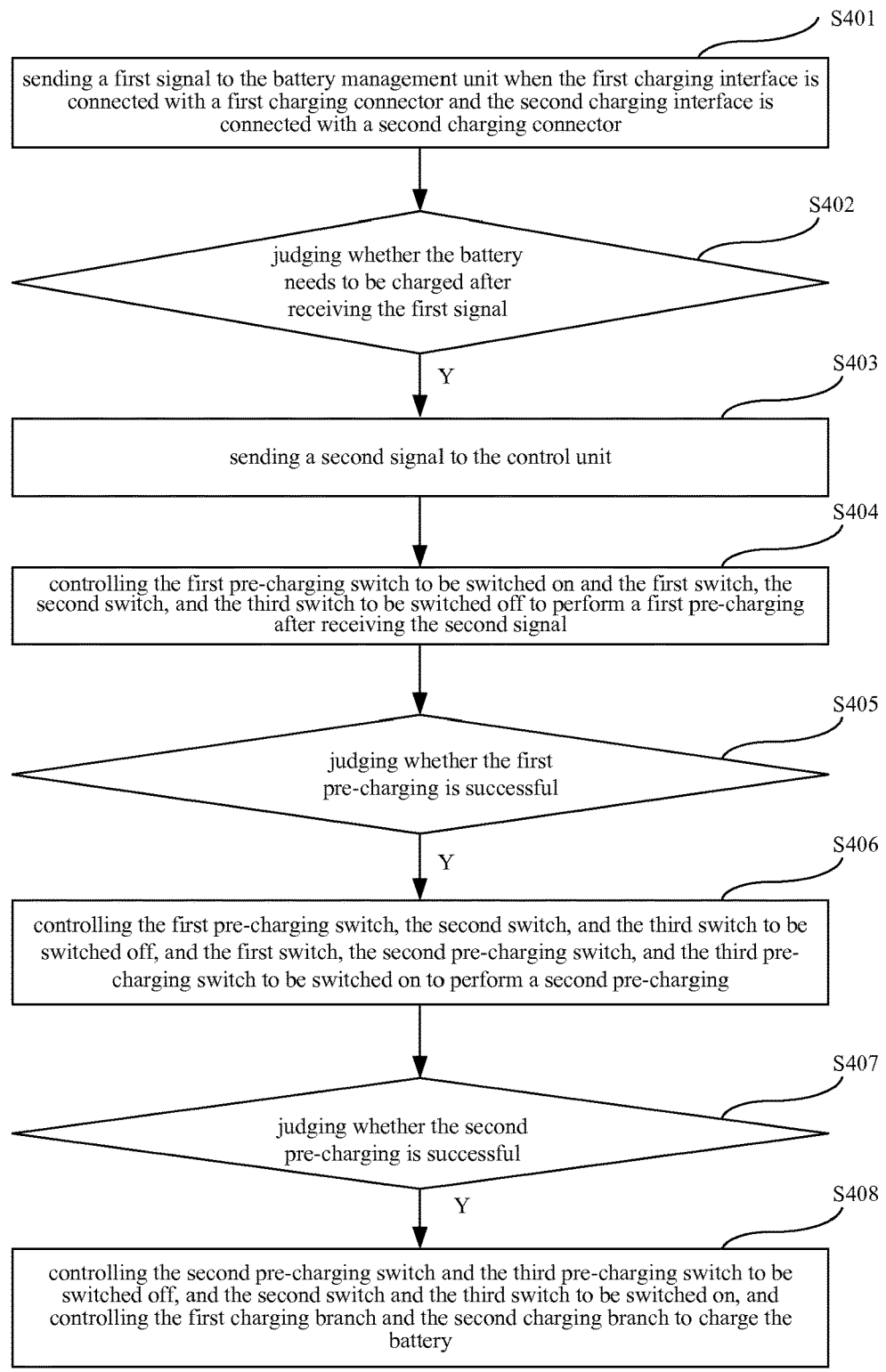
FIG. 4 is a flow chart of a method for controlling charging a vehicle with a charging system according to a preferred embodiment of the present disclosure.

According to a preferred embodiment of the present disclosure, as shown in FIG. 4, a flow chart of the method for controlling charging the vehicle with the charging system is provided. Referring to FIG. 4, the method comprises the following steps.

In step S401, the control unit sends a first signal to the battery management unit when the first charging interface is connected with a first charging connector and the second charging interface is connected with a second charging connector.

In step S402, the battery management unit judges whether the battery needs to be charged after receiving the first signal.

In step S403, if the battery needs to be charged, the battery management unit sends a second signal to the control unit.

In step S404, the control unit controls the first pre-charging switch to be switched on and the first switch, the second switch, and the third switch to be switched off to perform a first pre-charging after receiving the second signal.

In step S405, the control unit judges whether a first difference between the first busbar voltage V1 of the first charging branch and a first predetermined voltage is within a second predetermined voltage range and a pre-charging time is within a first predetermined time range, and whether a second difference between the second busbar voltage V2 of the second charging branch and a second predetermined voltage is within the second predetermined voltage range and the pre-charging time is within the first predetermined time range. That is, the control unit judges whether the first pre-charging is successful.

In step S406, if yes, the control unit controls the first pre-charging switch, the second switch, and the third switch to be switched off, and the first switch, the second pre-charging switch, and the third pre-charging switch to be switched on to perform a second pre-charging.

In step S407, the control unit judges whether the third busbar voltage V3 of the first charging branch is within a third predetermined voltage range and the fourth busbar voltage V4 of the second charging branch is within a fourth predetermined voltage range. That is, the control unit judges whether the second pre-charging is successful.

In step S408, if yes, the control unit controls the second pre-charging switch and the third pre-charging switch to be switched off, and the second switch and the third switch to be switched on, and controls the first charging branch and the second charging branch to charge the battery.

With the method for controlling charging the vehicle with the charging system according to embodiments of the present disclosure, the first pre-charging and the second pre-charging are performed before the battery is charged, which not only performs the failure self-test for the whole charging system, but also improves a stability of the charging system. In addition, the rapid voltage increase between terminals of the second capacitor C12 and terminals of the fourth capacitor C22, which may cause the large current impact in the circuit, may be avoided, thus preventing the damages to the charging system resulted from the large current impact.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A charging system for a vehicle, comprising:
a battery;
a first charging branch comprising a first rectifying unit, a first transforming unit and a first charging interface, wherein the battery is connected with the first charging interface via the first rectifying unit, the first transforming unit is connected between the battery and the first rectifying unit, the first transforming unit comprises a first capacitor, a second capacitor, a first inductor, a first switching transistor, and a second switching transistor, and the first charging interface is connected with a first charging connector;
a second charging branch comprising a second rectifying unit, a second transforming unit and a second charging interface, wherein the battery is connected with the second charging interface via the second rectifying unit, the second transforming unit is connected between the battery and the second rectifying unit, the second transforming unit comprises a third capacitor, a fourth capacitor, a second inductor, a third switching transistor, and a fourth switching transistor, and the second charging interface is connected with a second charging connector; and a control unit connected with the first rectifying unit and the second rectifying unit respectively and configured to control the first charging branch and the second charging branch to charge the battery through the first charging connector and the second charging connector together, so as to increase a charging power.

2. The charging system according to claim 1, further comprising:
a first switch having a first terminal connected with the battery and a second terminal connected with the first rectifying unit and the second rectifying unit respectively;
a second switch connected between the first rectifying unit and the first charging interface; and
a third switch connected between the second rectifying unit and the second charging interface.

3. The charging system according to claim 2, further comprising:
a first pre-charging resistor and a first pre-charging switch, wherein a first terminal of the first pre-charging resistor is connected with a first terminal of the first pre-charging switch, and a second terminal of the first pre-charging resistor and a second terminal of the first pre-charging switch are connected with the first switch respectively.

4. The charging system according to claim 3, further comprising:
a second pre-charging resistor and a second pre-charging switch, wherein a first terminal of the second pre-charging resistor is connected with a first terminal of the second pre-charging switch, and a second terminal of the second pre-charging resistor and a second terminal of the second pre-charging switch are connected with the second switch respectively; and
a third pre-charging resistor and a third pre-charging switch, wherein a first terminal of the third pre-charging resistor is connected with a first terminal of the third pre-charging switch, and a second terminal of the third pre-charging resistor and a second terminal of the third pre-charging switch are connected with the third switch respectively.

5. The charging system according to claim 1, further comprising:
a first fuse connected between the first rectifying unit and the first charging interface; and
a second fuse connected between the second rectifying unit and the second charging interface.

6. The charging system according to claim 1, further comprising:
a first filter unit connected between the first rectifying unit and the first charging interface, and
a second filter unit connected between the second rectifying unit and the second charging interface.

7. The charging system according to claim 1, further comprising a battery management unit connected with the control unit and the battery respectively,
wherein the control unit is configured to send a first signal to the battery management unit when the first charging interface is connected with the first charging connector and the second charging interface is connected with the second charging connector,
the battery management unit is configured to judge whether the battery needs to be charged after receiving the first signal, and to send a second signal to the control unit when the battery needs to be charged, and the control unit is further configured to control the first charging branch and the second charging branch to charge the battery after receiving the second signal.

8. The charging system according to claim 7, wherein the battery management unit is configured to send the second signal to the control unit when the first charging interface is connected with the first charging connector and the second charging interface is connected with the second charging connector.

9. The charging system according to claim 1, wherein the first charging connector and the second charging connector are connected with two charging piles respectively.

10. A vehicle comprising a charging system, wherein the charging system comprises:
a battery;
a first charging branch comprising a first rectifying unit, a first transforming unit and a first charging interface, wherein the battery is connected with the first charging interface via the first rectifying unit, the first transforming unit is connected between the battery and the first rectifying unit, the first transforming unit comprises a first capacitor, a second capacitor, a first inductor, a first switching transistor, and a second switching transistor, and the first charging interface is connected with a first charging connector;
a second charging branch comprising a second rectifying unit, a second transforming unit and a second charging interface, wherein the battery is connected with the second charging interface via the second rectifying unit, the second transforming unit is connected between the battery and the second rectifying unit, the second transforming unit comprises a third capacitor, a fourth capacitor, a second inductor, a third switching transistor, and a fourth switching transistor, and the second charging interface is connected with a second charging connector; and
a control unit connected with the first rectifying unit and the second rectifying unit respectively and configured to control the first charging branch and the second charging branch to charge the battery through the first charging connector and the second charging connector together, so as to increase a charging power.

11. The vehicle according to claim 10, the charging system further comprising:
a first switch having a first terminal connected with the battery and a second terminal connected with the first rectifying unit and the second rectifying unit respectively;
a second switch connected between the first rectifying unit and the first charging interface; and
a third switch connected between the second rectifying unit and the second charging interface.

12. The vehicle according to claim 11, the charging system further comprising:
a first pre-charging resistor and a first pre-charging switch, wherein a first terminal of the first pre-charging resistor is connected with a first terminal of the first pre-charging switch, and a second terminal of the first pre-charging resistor and a second terminal of the first pre-charging switch are connected with the first switch respectively.

13. The vehicle according to claim 12, the charging system further comprising:
a second pre-charging resistor and a second pre-charging switch, wherein a first terminal of the second pre-charging resistor is connected with a first terminal of the second pre-charging switch, and a second terminal of the second pre-charging resistor and a second terminal of the second pre-charging switch are connected with the second switch respectively; and a third pre-charging resistor and a third pre-charging switch, wherein a first terminal of the third pre-charging resistor is connected with a first terminal of the third pre-charging switch, and a second terminal of the third pre-charging resistor and a second terminal of the third pre-charging switch are connected with the third switch respectively.

14. The vehicle according to claim 10, the charging system further comprising a battery management unit connected with the control unit and the battery respectively, wherein the control unit is configured to send a first signal to the battery management unit when the first charging interface is connected with the first charging connector and the second charging interface is connected with the second charging connector, the battery management unit is configured to judge whether the battery needs to be charged after receiving the first signal, and to send a second signal to the control unit when the battery needs to be charged, and the control unit is further configured to control the first charging branch and the second charging branch to charge the battery after receiving the second signal.

15. The vehicle according to claim 14, wherein the battery management unit is configured to send the second signal to the control unit when the first charging interface is connected with the first charging connector and the second charging interface is connected with the second charging connector.

16. The vehicle according to claim 10, wherein the first charging connector and the second charging connector are connected with two charging piles respectively.

* * * * *